(12) United States Patent
Uchikawa

(10) Patent No.: US 10,264,143 B2
(45) Date of Patent: Apr. 16, 2019

(54) IMAGE FORMING APPARATUS

(71) Applicant: CANON KABUSHIKI KAISHA, Tokyo (JP)

(72) Inventor: Shinichi Uchikawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 15/276,558

(22) Filed: Sep. 26, 2016

(65) Prior Publication Data

US 2017/0099399 A1    Apr. 6, 2017

(30) Foreign Application Priority Data

Oct. 1, 2015  (JP) ................. 2015-196029

(51) Int. Cl.
  *G06F 3/12*   (2006.01)
  *H04N 1/00*   (2006.01)
  *G06K 15/02*  (2006.01)

(52) U.S. Cl.
  CPC ....... *H04N 1/00206* (2013.01); *G06F 3/1203* (2013.01); *G06F 3/1248* (2013.01); *H04N 2201/0034* (2013.01); *H04N 2201/0093* (2013.01)

(58) Field of Classification Search
  None
  See application file for complete search history.

(56) References Cited

U.S. PATENT DOCUMENTS

| | | | | |
|---|---|---|---|---|
| 5,726,768 A | * | 3/1998 | Ishikawa | H04N 1/00206 358/442 |
| 2003/0160998 A1 | * | 8/2003 | Kuwahara | H04N 1/00206 358/1.15 |
| 2006/0232811 A1 | * | 10/2006 | Yokoyama | G06K 15/005 358/1.14 |
| 2007/0189266 A1 | * | 8/2007 | Izumi | H04N 1/00214 370/352 |
| 2008/0127307 A1 | * | 5/2008 | Fukuta | G06F 21/608 726/3 |

(Continued)

FOREIGN PATENT DOCUMENTS

| | | | | |
|---|---|---|---|---|
| JP | 2004-118701 | * | 4/2004 | ............... G06F 3/12 |
| JP | 2004-235773 A | | 8/2004 | |

*Primary Examiner* — Beniyam Menberu
(74) *Attorney, Agent, or Firm* — Canon U.S.A., Inc. IP Division

(57) ABSTRACT

An image forming apparatus includes an Internet Printing Protocol FaxOut Service (IPP-FAX) processing unit and first and second processing units. The IPP-FAX processing unit receives a service request relating to IPP-FAX from an external apparatus. The first processing unit generates, and stores, image data from page description language (PDL) data. The IPP-FAX processing unit acquires PDL data, image processing information, and destination information from the service request and notifies the first processing unit of the PDL data and the image processing information. The first processing unit generates, and stores, image data from the PDL data based on the image processing information. The IPP-FAX processing unit notifies the second processing unit of the destination information, and image data indicating information. The second processing unit performs fax transmission of the stored image data to a destination indicated by the destination information.

19 Claims, 6 Drawing Sheets

(56) References Cited

U.S. PATENT DOCUMENTS

| | | | |
|---|---|---|---|
| 2009/0021780 A1* | 1/2009 | Sato | H04N 1/00347 358/1.15 |
| 2009/0147313 A1* | 6/2009 | Miyagi | H04N 1/2307 358/2.1 |
| 2010/0046036 A1* | 2/2010 | Tsujii | H04N 1/0044 358/3.24 |
| 2014/0313534 A1* | 10/2014 | Obara | G06F 3/122 358/1.13 |
| 2017/0064098 A1* | 3/2017 | Inoishi | H04N 1/00106 |

\* cited by examiner

IMAGE FORMING APPARATUS

BACKGROUND OF THE INVENTION

Field of the Invention

The present invention relates to an image forming apparatus.

Description of the Related Art

Some conventional image forming apparatuses have a PC-FAX function, which is a function of performing fax transmission of a document file on a personal computer (PC). Japanese Patent Application Laid-Open No. 2004-235773 discusses a configuration for converting a received document file into a bitmap image, and performing fax transmission of the bitmap image.

In the PC-FAX function, a fax driver operating on the PC converts a document file to be subjected to fax transmission, into a monochrome binary image file in a format such as Tagged Image File Format Modified Modified Read (TIFF-MMR) format. The fax driver then transmits this image file to an image forming apparatus, together with information indicating fax transmission destination. The image forming apparatus dials the fax transmission destination received from the PC, and performs coding processing for allowing communication of the image file by a fax line. The image forming apparatus then transmits the image file.

Further, among image forming apparatuses, some products have a BOX function. The BOX function is, for example, a function of storing image data in a BOX, or a function of synthesizing one or more pieces of image data.

The function of storing image data in a box is a function of converting document data specified at a PC into image data, and storing the image data in a BOX. This function is referred to as PDLtoBOX, in the present specification.

In the PDLtoBOX function, first, a user selects a document file desired to be stored and designates a box number to be used for storage in a printer driver, at a PC. The printer driver then converts the document file into page description language (PDL) data, and transmits the PDL data to an image forming apparatus, together with the box number to be used for storage. The image forming apparatus analyzes the PDL data received, from the PC, and converts the PDL data into image data. The image forming apparatus then stores the image data in a BOX corresponding to the designated box number.

Furthermore, among image forming apparatus, some products have a BOXtoFAX function, which is a function of selecting image data stored in a BOX, and performing fax transmission of the selected image data.

The BOXtoFAX function is implemented as follows. First, a user dials a designated fax transmission destination. Next, an image forming apparatus transmits image data stored in a designated box, having been subjected to coding processing that allows communication by a fax line.

On the other hand, in recent years, a technique called Internet Printing Protocol (IPP) FaxOut Service has been devised.

In this IPP FaxOut Service, the IPP is used to provide information such as fax transmission destination information, an image processing method for fax image data, and cover page information. For fax data to be transmitted, data in any of various PDL formats such as Printer Working Group Raster (PWG-RASTER) and Portable Document Format (PDF) can be used.

In the PC-FAX function, the fax driver is configured to convert a document file on a PC into image data to perform fax transmission, thereby enabling execution of the fax transmission, even if an image forming apparatus is not provided with an image-data conversion function. Further, in some image data conversion, binarization processing is performed. In that case, in an image forming apparatus, it is not necessary to generate binary data for performing fax transmission.

However, in the IPP FaxOut Service, fax transmission data to be received from a PC is PDL data, i.e., the fax transmission data is not necessarily image data. Moreover, the image data is not binary image data in some cases.

As a result, to perform fax transmission with the IPP FaxOut Service in the image forming apparatus, it is necessary for the IPP FaxOut Service of the image forming apparatus to perform processing for conversion to image data, which is performed on the PC side in the PC-FAX function. In other words, it is necessary to perform processing for converting the PDL data generated on the PC side into image data, in the IPP FaxOut Service.

SUMMARY OF THE INVENTION

According to an aspect of the present invention, an image forming apparatus includes an Internet Printing Protocol FaxOut Service (IPP-FAX) processing unit configured to receive a service request relating to IPP-FAX from an external apparatus on a network, a first processing unit configured to generate image data from page description language (PDL) data and to store the generated image data in a storage unit, and a second processing unit configured to perform fax transmission of the image data stored in the storage unit, wherein the IPP-FAX processing unit acquires PDL data, image processing information, and destination information from the service request, wherein the IPP-FAX processing unit notifies the first processing unit of the PDL data and the image processing information, wherein the first processing unit generates image data from the PDL data based on the image processing information, and stores the generated image data in the storage unit, wherein the IPP-FAX processing unit notifies the second processing unit of the destination information, and information indicating the image data, and wherein the second processing unit performs fax transmission of the image data stored in the storage unit to a destination indicated by the destination information.

Further features of the present invention will become apparent from the following description of exemplary embodiments with reference to the attached drawings.

DESCRIPTION OF THE EMBODIMENTS

An exemplary embodiment of the present invention will be described below with reference to the drawings.

Figure 1:
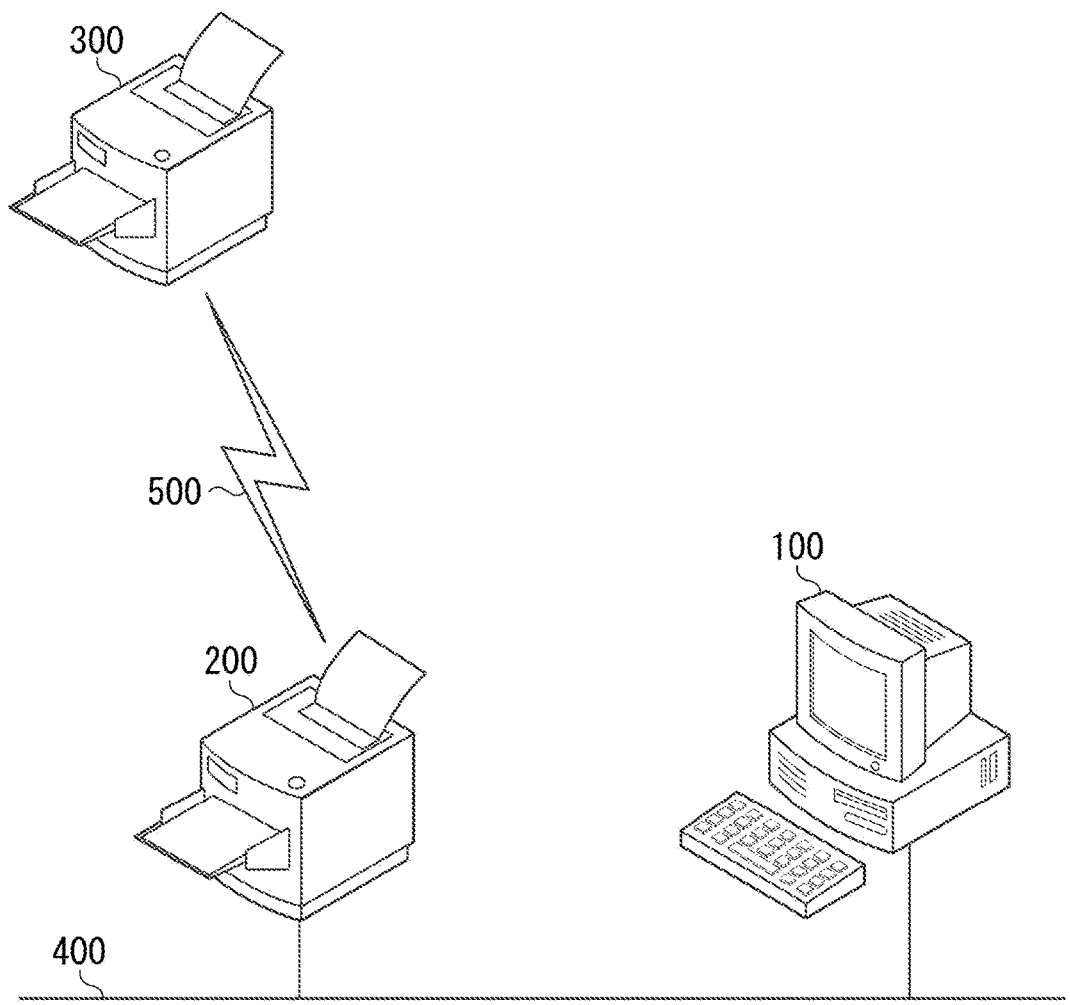
FIG. 1 is a diagram illustrating an example of a system configuration of an information processing system.

FIG. 1 is a diagram illustrating an example of a system configuration of an information processing system.

As illustrated in FIG. 1, the information processing system includes a 100, an image forming apparatus 200, and an image forming apparatus 300. In the information processing system, the PC 100 and the image forming apparatus 200 are communicably connected via a network 400. Further, the image forming apparatus 200 and the image forming apparatus 300 are communicably connected via a telephone network 500.

In the information processing system, an operator of the PC 100 carries out fax transmission of document data on the PC 100, from the image forming apparatus 200 provided with IPP FaxOut Service, to the image forming apparatus 300.

Figure 2:
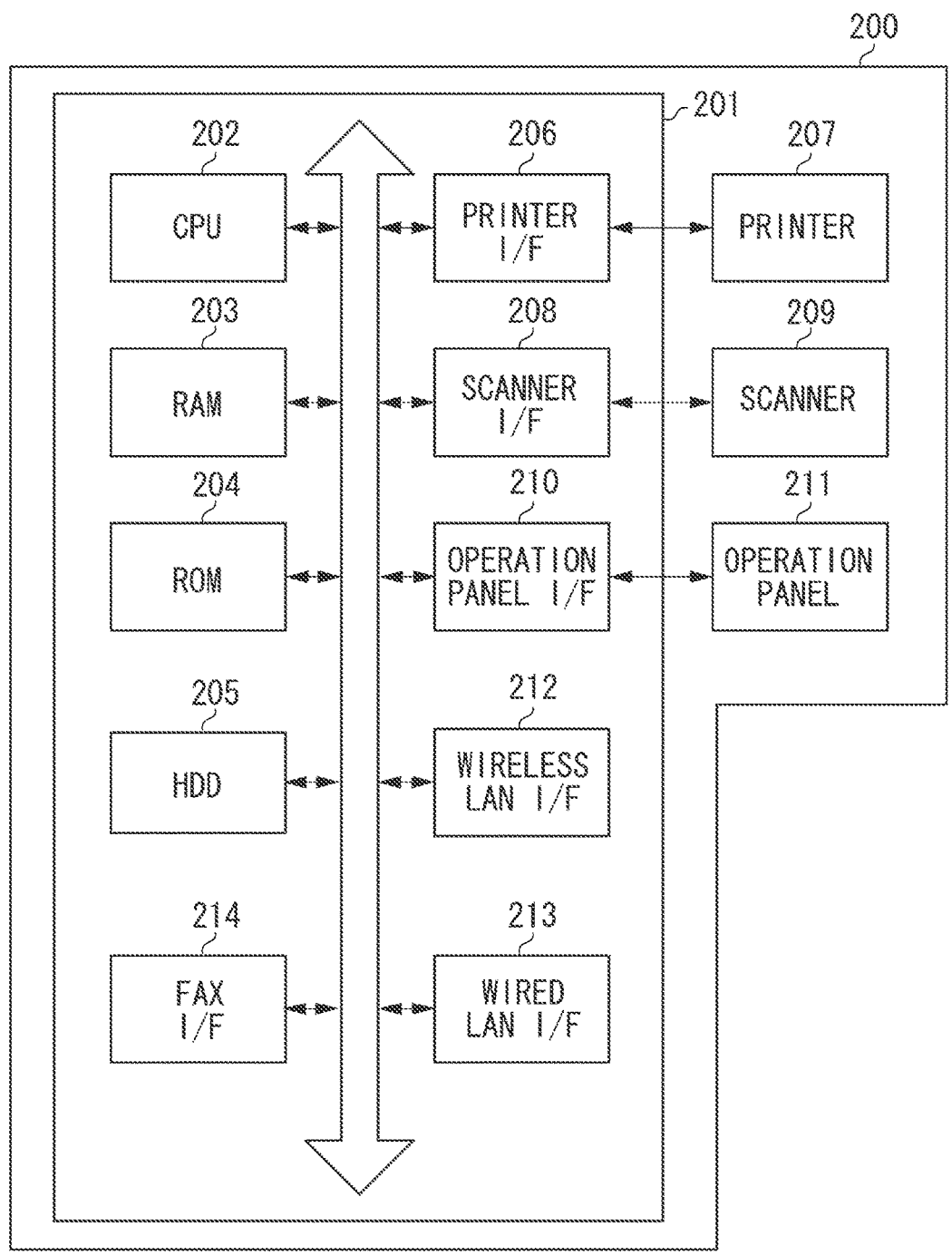
FIG. 2 is a block diagram illustrating an example of a hardware configuration of an image forming apparatus.

FIG. 2 is a block diagram illustrating an example of a hardware configuration of the image forming apparatus 200.

A control unit 201 including a central processing unit (CPU) 202 controls the operation of the entire image forming apparatus 200. The CPU 202 performs various controls such as communication control, by reading out a control program stored in a read only memory (ROM) 204. A random access memory (RAM) 203 is used as a temporary area such as a main memory and a work area for the CPU 202. A hard disk drive (HDD) 205 stores data, various programs, and various information tables. The HDD 205 also stores image data stored in a BOX 1204.

A printer interface (I/F) 206 connects a printer 207 and the control unit 201. The printer 207 executes print processing on a sheet fed from a feeding cassette, based on print data input via the printer I/F 206.

A scanner I/F 208 connects a scanner 209 and the control unit 201. The scanner 209 generates image data by reading a placed original document. The image data generated by the scanner 209 is printed by the printer 207, stored in the HDD 205, or transmitted to an external apparatus via a fax I/F 214, a wireless local area network (LAN) I/F 212, or a wired LAN I/F 213.

An operation panel I/F 210 connects an operation panel 211 and the control unit 201.

The wireless LAN I/F 212 executes wireless communication with an external apparatus such as a mobile terminal and a PC. Through this wireless communication, the image forming apparatus 200 receives print data from the external apparatus, and the printer 207 executes the print processing based on the received print data. The image forming apparatus 200 can also transmit the image data generated by the scanner 209 to the external apparatus via the wireless LAN I/F 212.

The wired LAN I/F 213 is an interface to which a LAN cable is connected and can thereby communicate with an external apparatus.

The fax I/F 214 is an interface to which a telephone line cable is connected and is thereby connected to a telephone network by analog or integrated services digital network (ISDN) communication.

The CPU 202 executes processing by reading a program stored in the ROM 204 or the HDD 205 into the RAM 203, thereby implementing a software configuration illustrated in FIG. 3 (described below) and processing in a flowchart illustrated in FIG. 4 (described below). However, the image forming apparatus 200 may have a plurality of CPUs and a plurality of memories, and the plurality of CPUs may operate in cooperation to implement various kinds of processing based on a program.

Figure 3:
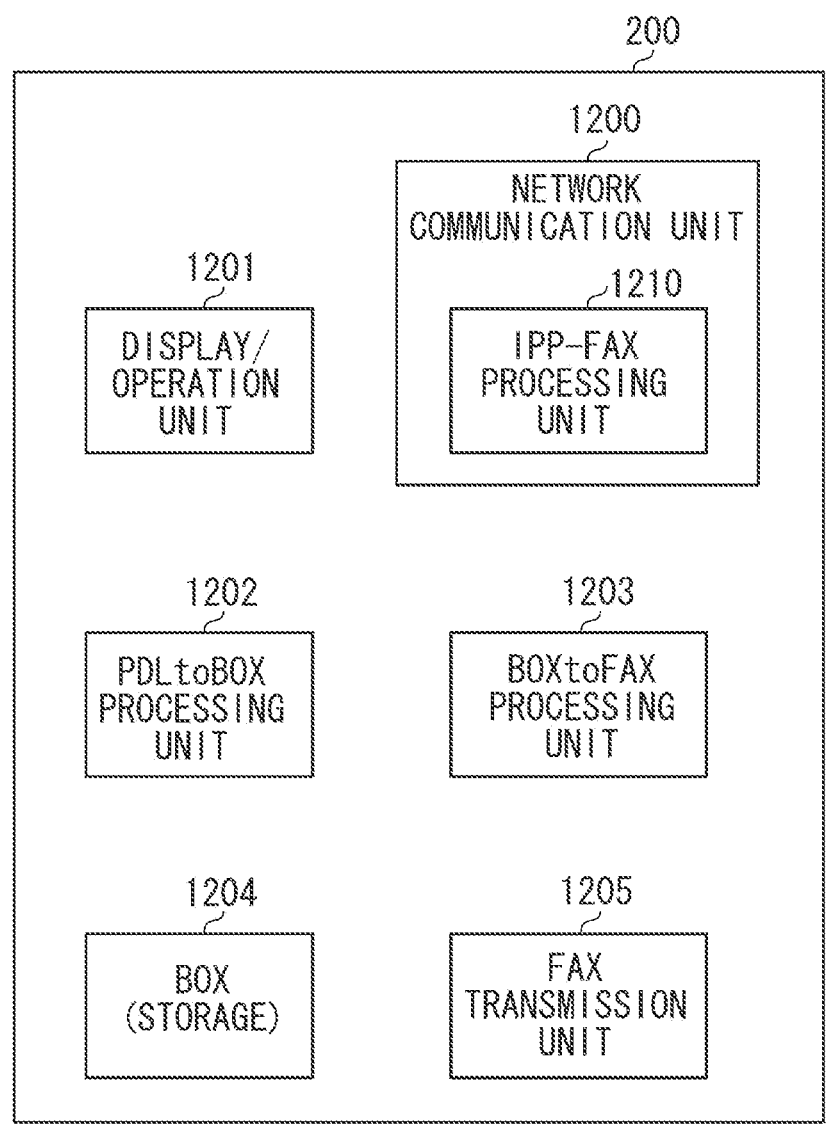
FIG. 3 is a block diagram illustrating an example of a software configuration of the image forming apparatus.
Figure 4:
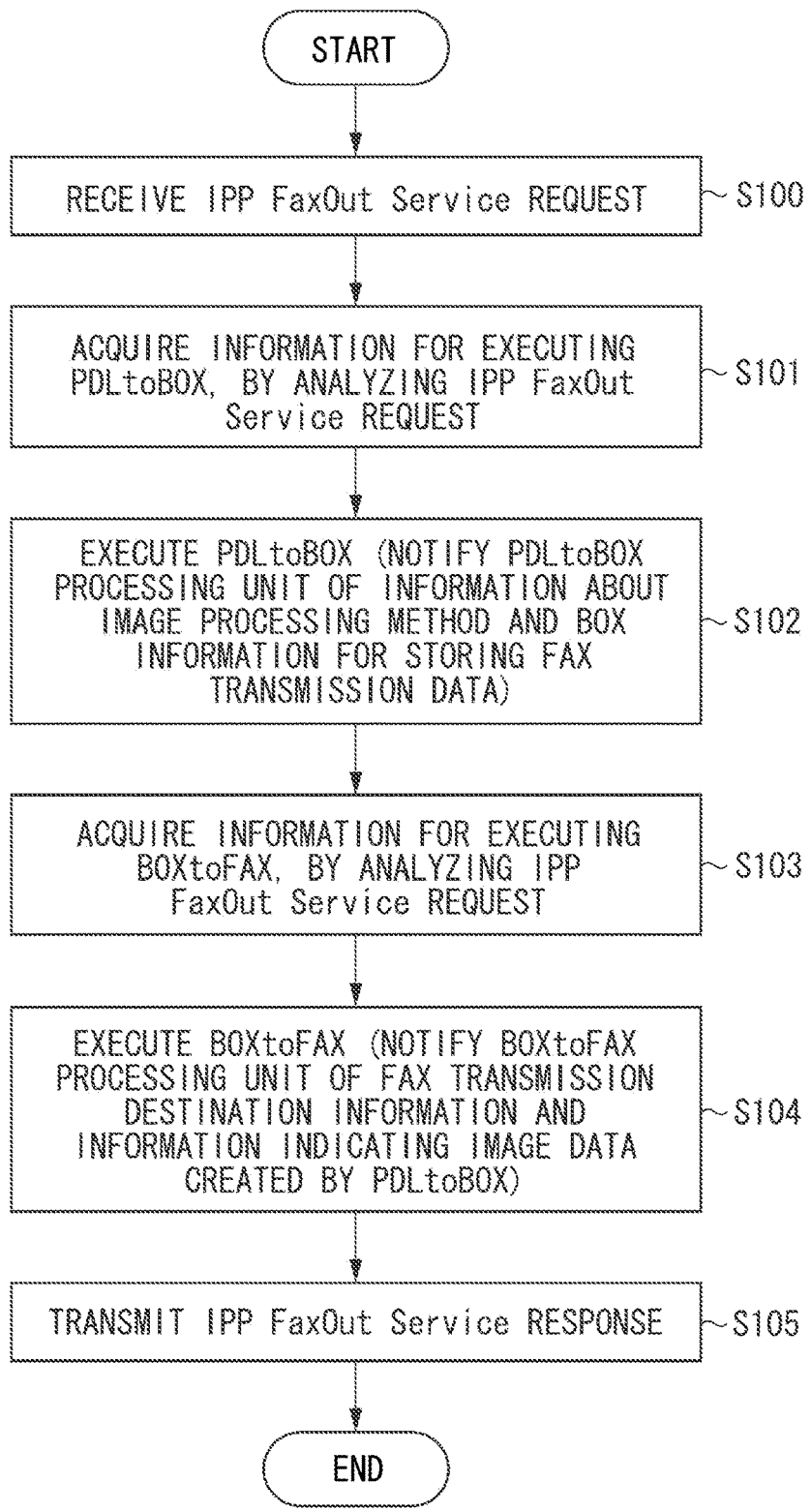
FIG. 4 is a flowchart illustrating an example of information processing.

FIG. 3 is a block diagram illustrating an example of a software configuration of the image forming apparatus 200.

A network communication unit 1200 controls the wireless communication executed by the wireless LAN I/F 212, and controls the communication executed by the wired LAN I/F 213. Further, the network communication unit 1200 includes an IPP-FAX processing unit 1210 that implements the IPP FaxOut Service.

A display/operation unit 1201 has a user I/F function for allowing an operator of the image forming apparatus 200 to perform setting and operation on the image forming apparatus 200.

A PDLtoBOX processing unit 1202 has a function of converting PDL data into image data, and storing the image data in a predetermined area of the BOX (storage) 1204. Processing of the PDLtoBOX processing unit 1202 is an example of first processing of converting fax data into image data and storing the image data in a storage. The PDL data is an example of the fax data.

A BOXtoFAX processing unit 1203 provides a function of performing fax transmission of image data stored in BOX (storage) 1204 to a fax transmission destination, which are designated, for example, via the display/operation unit 1201. The fax transmission of this function is performed using a fax transmission unit 1205. Processing of the BOXtoFAX processing unit 1203 is an example of second processing of designating image data stored in a storage and performing fax transmission of the designated image data.

The fax transmission unit 1205 performs fax transmission by controlling the fax I/F 214.

Next, an example of information processing by the IPP-FAX processing unit 1210 and the like that implements the IPP FaxOut Service, will be described with reference to a flowchart illustrated in FIG. 4 and other drawings.

The description will be given using a case where the operator of the PC 100 carries out fax transmission of document data on the PC 100 from the image forming apparatus 200 provided with the IPP FaxOut Service to the image forming apparatus 300.

Figure 5:
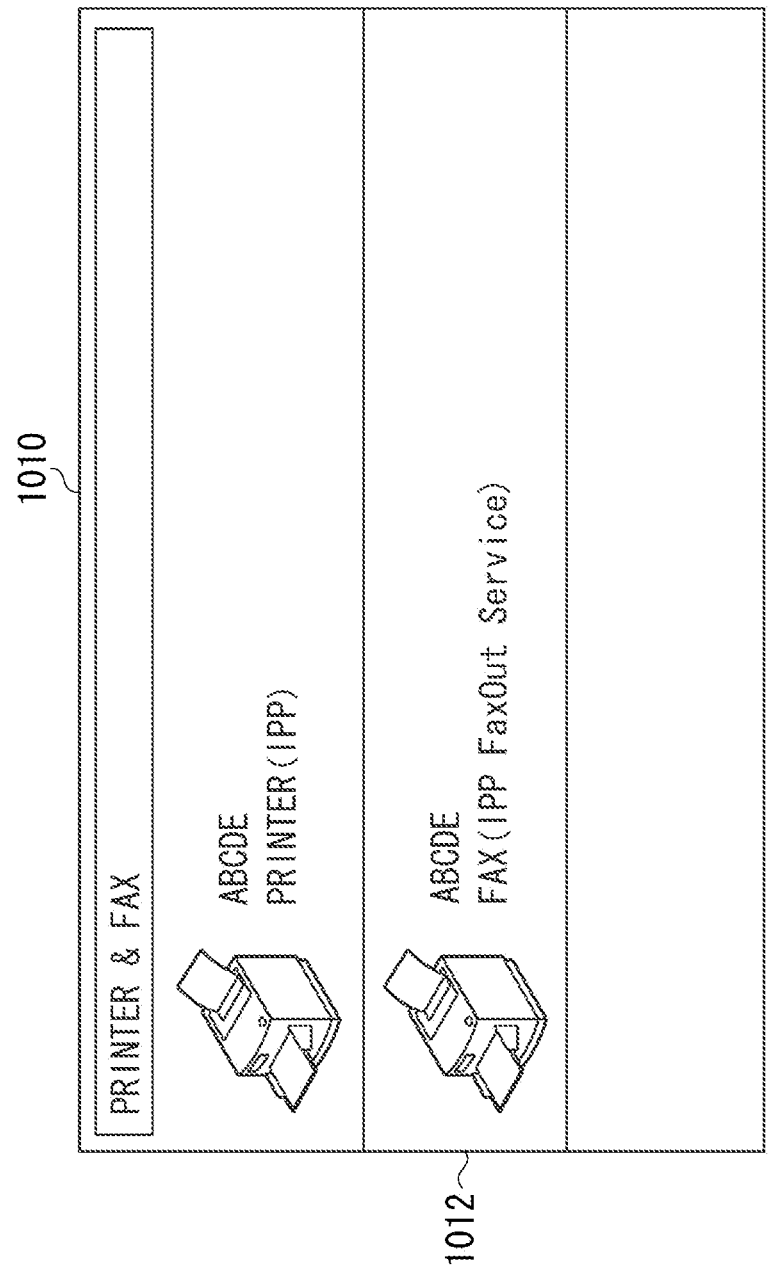
FIG. 5 is a diagram illustrating an example of a printer & fax screen.
Figure 6:
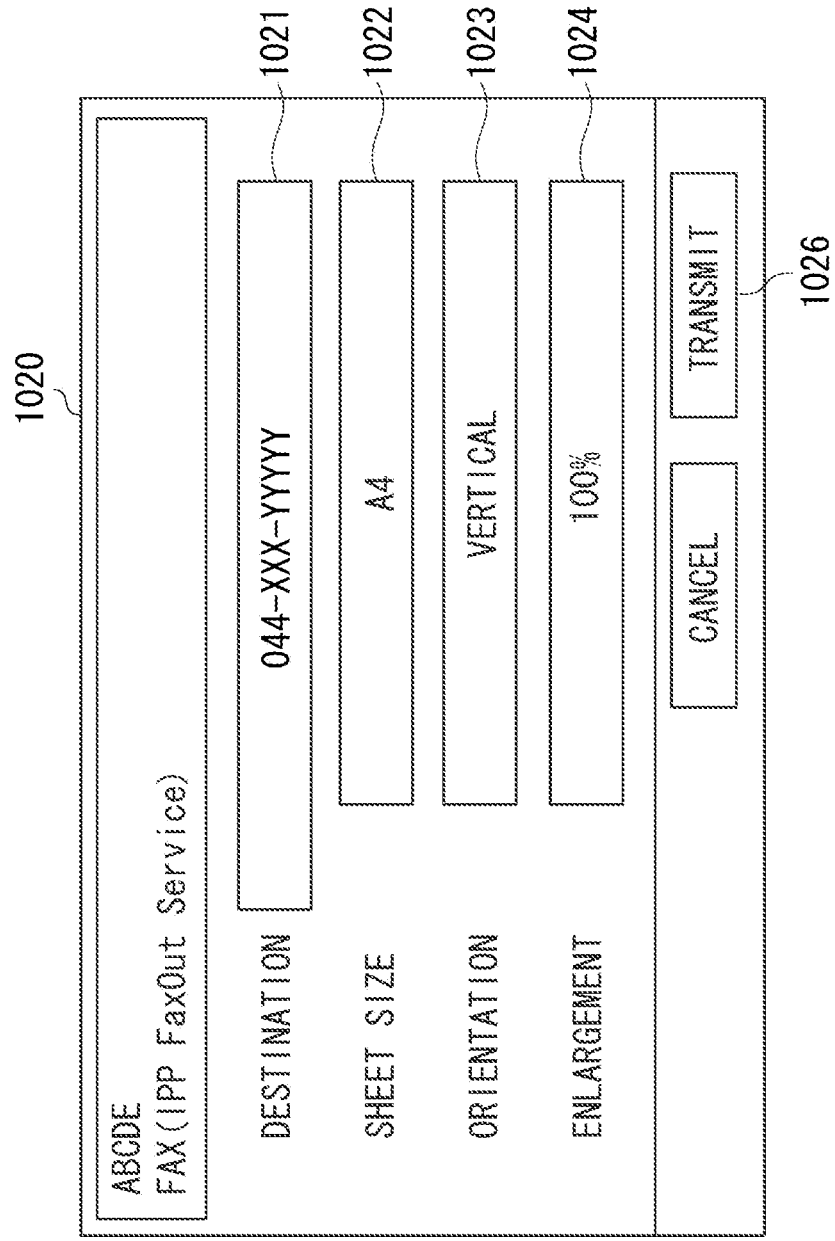
FIG. 6 is a diagram illustrating an example of a FAX setting screen.

To select an image forming apparatus to which the document data is to be transmitted, the operator of the PC 100 selects an icon 1012 indicating a FAX (IPP FaxOut Service) function of the image forming apparatus 200 in a printer & fax screen 1010 illustrated in FIG. 5. This screen then transitions to a FAX (IPP FaxOut Service) setting screen 1020 illustrated in FIG. 6.

In the FAX setting screen 1020, the operator inputs a telephone number of the image forming apparatus 300 as destination information 1021 of the fax transmission. The operator then performs setting for designating a sheet size 1022, an orientation 1023 of a fax document image to be transmitted, and enlargement (or reduction) 1024 of the fax document image. Then, the operator of the PC 100 selects a TRANSMIT button 1026. The PC 100 then transmits an IPP FaxOut Service request including information such as the input telephone number and the designated setting information to the IPP FaxOut Service of the image forming apparatus 200 via the network 400.

In the image forming apparatus 200, upon receipt of the IPP FaxOut Service request transmitted from the PC 100 via the network 400, the IPP-FAX processing unit 1210 of the network communication unit 1200 processes the received request.

In step S100, the IPP-FAX processing unit 1210 receives the IPP FaxOut Service request from the network 400.

In step S101, the IPP-FAX processing unit 1210 acquires information for executing PDLtoBOX, from the IPP FaxOut Service request. More specifically, the IPP-FAX processing unit 1210 acquires information about image processing method (sheet size information, orientation, and image enlargement information), and fax transmission data (PDL data). The information about image processing method is an example of image processing information. The information about image processing method may be information including at least one of sheet size information, orientation (orientation information), and image enlargement information.

In step S102, the IPP-FAX processing unit 1210 executes processing as a PDLtoBOX job based on the acquired information. More specifically, the IPP-FAX processing unit 1210 requests the PDLtoBOX, by notifying the PDLtoBOX processing unit 1202 of the acquired information about image processing method, and BOX information for storing the acquired fax transmission data. The PDLtoBOX processing unit 1202 analyzes the designated PDL data, thereby generating image data according to an image processing method specified in the information about image processing method. The PDLtoBOX processing unit 1202 then stores the generated image data in an area corresponding to the BOX information designated as a storage location. In this way, the PDLtoBOX is implemented.

In step S103, the IPP-FAX processing unit 1210 acquires fax destination information for the transmission from the IPP FaxOut Service request.

In step S104, the IPP-FAX processing unit 1210 executes BOXtoFAX based on the fax destination information. The IPP-FAX processing unit 1210 requests the BOXtoFAX, by notifying the BOXtoFAX processing unit 1203 of the designated fax transmission destination information, and information indicating the image data created as a result of the execution of the PDLtoBOX. The BOXtoFAX processing unit 1203 executes fax transmission of the image data, which is stored in the box (the area corresponding to the BOX information), to the image forming apparatus 300 designated as the fax transmission destination, by using the fax transmission unit 1205, via the telephone network 500. In this way, the BOXtoFAX is implemented.

In step S105, upon completion of the above-described series of processes, the IPP-FAX processing unit 1210 creates an IPP FaxOut Service response, and transmits the created IPP FaxOut Service response to the PC 100, via the network 400.

This ends the processing of the IPP-FAX processing unit 1210. In this way, the image forming apparatus 200 can perform the fax transmission to the image forming apparatus 300, according to the IPP FaxOut Service request transmitted from the PC 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-196029, filed Oct. 1, 2015, which is hereby incorporated by reference herein in its entirety.

What is claimed is:

1. An image forming apparatus comprising:
one or more processors;
memory;
an Internet Printing Protocol FaxOut Service (IPP-FAX) processing application configured to process an IPP-FAX service request received from an external apparatus on a network; and
a first application configured to process page description language (PDL) data,
wherein the memory stores instructions that, when executed by the one or more processors, cause the image forming apparatus to perform operations including:
receiving the IPP-FAX service request from the external apparatus, wherein the IPP-FAX service request includes fax transmission data that is in a PDL format,
analyzing the IPP-FAX service request for the IPP-FAX processing application to acquire information to convert the PDL format fax transmission data into image data,
causing the first application to convert the PDL format fax transmission data into image data using the information acquired by the IPP-FAX processing application and to store the image data, and
performing fax transmission of the stored image data based on the received IPP-FAX service request.

2. The image forming apparatus according to claim 1, wherein the information in the received IPP-FAX service request includes fax destination information and image processing information.

3. The image forming apparatus according to claim 2, wherein the image processing information includes at least one of the following: sheet size information, orientation information, and image enlargement information.

4. The image forming apparatus according to claim 1, wherein causing the first application to convert the PDL format fax transmission data includes generating image data according to an image processing method specified in information about image processing method acquired by the IPP-FAX processing unit.

5. The image forming apparatus according to claim 1, wherein the IPP-FAX processing application is configured to execute processing as a PDLtoBOX job based on the information acquired from the IPP-FAX service request.

6. The image forming apparatus according to claim 5, wherein the first application is a PDLtoBOX application and the IPP-FAX processing application notifies the PDLtoBOX application of the acquire information.

7. The image forming apparatus according to claim 6, wherein the IPP-FAX processing application notifies the PDLtoBOX application of Box information for storing the received PDL format fax transmission data.

8. The image forming apparatus according to claim 1, wherein the image data is stored in a BOX, the image forming apparatus further comprising a BOXtoFAX application configured to perform the fax transmission of the image data stored in the BOX.

9. The image forming apparatus according to claim 8, further comprising a fax interface configured to be connected to a telephone network through a telephone line cable,
wherein performing includes performing fax transmission of the stored image data through the fax interface to a destination indicated by a telephone number.

10. A method for an image forming apparatus, wherein the image forming apparatus includes an Internet Printing Protocol FaxOut Service (IPP-FAX) processing application configured to process an IPP-FAX service request received from an external apparatus on a network, and includes a first application configured to process page description language (PDL) data, the method comprising:
receiving the IPP-FAX service request from the external apparatus, wherein the IPP-FAX service request includes fax transmission data that is in a PDL format;
analyzing the IPP-FAX service request for the IPP-FAX processing application to acquire information to convert the PDL format fax transmission data into image data;
causing the first application to convert the PDL format fax transmission data into image data using the information acquired by the IPP-FAX processing application and to store the image data; and
performing fax transmission of the stored image data based on the received IPP-FAX service request.

11. The method according to claim 10, wherein the information in the received IPP-FAX service request includes fax destination information and image processing information.

12. The method according to claim 11, wherein the image processing information includes at least one of the following: sheet size information, orientation information, and image enlargement information.

13. The method according to claim 10, wherein causing the first application to convert the PDL format fax transmission data includes generating image data according to an image processing method specified in information about image processing method acquired by the IPP-FAX processing unit.

14. The method according to claim 10, wherein the IPP-FAX processing application executes processing as a PDLtoBOX job based on the information acquired from the IPP-FAX service request.

15. The method according to claim 14, wherein the first application is a PDLtoBOX application, the method further comprising notifying, by the IPP-FAX processing application, the PDLtoBOX application of the acquire information.

16. The method according to claim 15, wherein notifying includes notifying, by the IPP-FAX processing application, the PDLtoBOX application of Box information for storing the received PDL format fax transmission data.

17. The method according to claim 10, wherein causing includes storing the image data in a BOX and performing includes performing, by a BOXtoFAX application the fax transmission of the image data stored in the BOX.

18. The method according to claim 17,
wherein the image forming apparatus further includes a fax interface connected to a telephone network through a telephone line cable, and
wherein performing includes performing fax transmission of the stored image data through the fax interface to a destination indicated by a telephone number.

19. A non-transitory computer-readable storage medium storing a program to cause an image forming apparatus to perform a method, wherein the image forming apparatus includes an Internet Printing Protocol FaxOut Service (IPP-FAX) processing application configured to process an IPP-FAX service request received from an external apparatus on a network, and includes a first application configured to process page description language (PDL) data, the method comprising:
receiving the IPP-FAX service request from the external apparatus, wherein the IPP-FAX service request includes fax transmission data that is in a PDL format;
analyzing the IPP-FAX service request for the IPP-FAX processing application to acquire information to convert the PDL format fax transmission data into image data;
causing the first application to convert the PDL format fax transmission data into image data using the information acquired by the IPP-FAX processing application and to store the image data; and
performing fax transmission of the stored image data based on the received IPP-FAX service request.

* * * * *